Aug. 28, 1934.   W. J. O'LEARY   1,971,793
ELECTRICAL APPARATUS
Filed Nov. 11, 1927
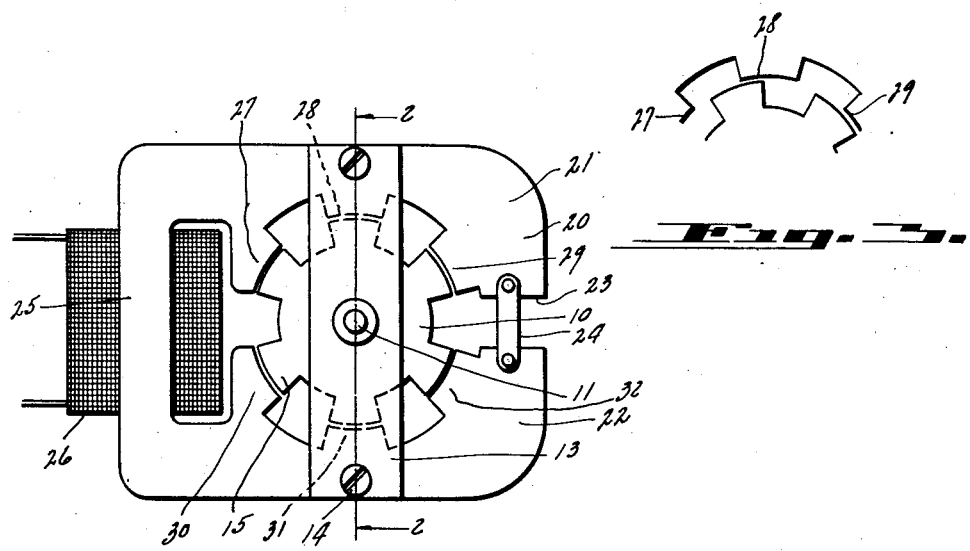
Fig. 3.
Fig. 1.
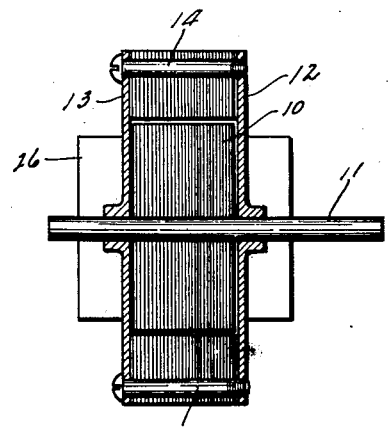
Fig. 2.
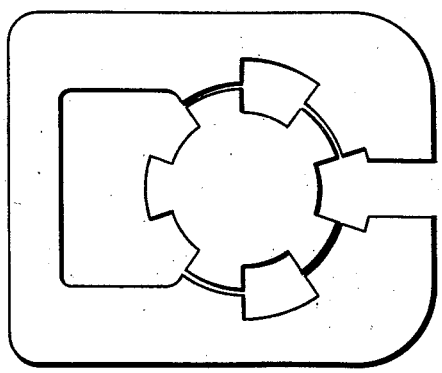
Fig. 4.
INVENTOR.
William J. O'Leary
BY Maréchal and Noe
ATTORNEYS.

Patented Aug. 28, 1934

1,971,793

UNITED STATES PATENT OFFICE 1,971,793

ELECTRICAL APPARATUS

William J. O'Leary, Montreal, Quebec, Canada, assignor to Walker and Dylvig, a partnership firm composed of Frank L. Walker and Henry G. Dylvig Application November 11, 1927, Serial No. 232,691

15 Claims. (Cl. 172—275)

This invention relates to devices which are adapted to operate at a synchronous speed, and more particularly to a synchronous device of this character having an unwound armature rotatably mounted in an electromagnetic field.

Another object of the invention is the provision of a synchronous device of this character which is simple in construction and which is adapted to operate smoothly at a speed which is constant and dependent only on the frequency of the alternating current supplied to the device.

Other objects and advantages of the invention will be apparent from the following description and from the drawing in which Fig. 1 is a side elevation of a synchronous device embodying the present invention;

Fig. 2 is a section on the line 2—2 of Fig. 1;

Fig. 3 is a detail view of several adjacent pole faces of the armature and field magnet; and Fig. 4 is a diagrammatic view of a modified form of construction.

Referring more particularly to the drawing, a synchronous motor is shown embodying an armature or rotor 10 adapted to revolve in an electromagnetic field created by an electromagnet 20. The armature 10 is preferably of laminated iron construction and, as shown, is formed of a number of sheets of soft iron arranged side by side to form a comparatively heavy and rather wide rotor member which is suitably fastened upon the mounting shaft 11 in any suitable manner. This shaft is supported as by means of the end straps 12 and 13 which are fastened by the bolts 14 to the sides of the electromagnet 20 and which form bearing members in which the shaft 11 is rotatably supported.

The armature or rotor 10 is provided with a series of unwound radial arms or pole salients 15, the peripheral portion of the armature being cut away as shown to provide a series of alternating projections and indentations in which the indentations are of approximately the same circumferential extent as the peripheral faces of the radial arms.

The electromagnet 20 is formed preferably of laminated soft iron and comprises the two opposite pole parts or limbs 21 and 22 each of which is provided with a series of alternating projections and indentations to form a series of pole projections having faces lying on a circumference adjacent the peripheries of the salients 15 of the armature. As shown in Fig. 1 each of the pole limbs 21 and 22 is provided with three projections which are spaced apart a distance substantially equal to the circumferential extent of a pole face. The ends of the electromagnet limbs are spaced a considerable distance apart as shown at 23 in Fig. 1, and for mechanical strength and rigidity are connected by a pair of straps 24 of brass or other non-magnetic material fastened to them in any suitable manner. At their other ends the limbs 20 and 21 are integrally formed with the yoke part 25 which serves as a core around which a single energizing coil 26, adapted to be connected to a suitable source of alternating current, is positioned.

When the coil 26 is energized by supplying, for example, 60-cycle alternating current at any suitable voltage, the electromagnet will be energized so that the magnet limbs 21 and 22 change rapidly in their polarity in accordance with the frequency of the alternating current impressed on the coil. The electromagnet is so arranged that when the coil is thus energized, all the pole projections of one limb of the electromagnet are, at a given instant, of the same polarity and opposite in polarity to the pole projections of the other limb. That is, the three pole projections 27, 28 and 29 of the limb 21 at one instant may be north and at the same instant the pole projections 30, 31 and 32 of the limb 22 are south. The lines of force created by the electromagnet will thus be in a downward direction (on Fig. 1) and as the distance between the ends of the electromagnet at 23 is considerable and the air gap between the pole projections and salients is quite narrow, the lines of force will travel through the soft iron armature. The number of armature salients is preferably substantially the same as the total number of pole projections provided on the electromagnet. Considering an instant when the three pole projections of the limb 21 are north, if the armature is in the position shown in Fig. 1 with the salients of the armature and pole projections of the field magnet adjacent each other in the radial direction, the lines of force will find an easy path across the narrow air gap and through the armature. Each north pole of the field magnet, corresponding to the respective pole projections 27, 28, 29, will create a south pole of the armature adjacent to it. It will be understood that if the device is brought up to its synchronous speed in any suitable manner the motor will continue to operate at its synchronous speed on the current supplied to the winding 26, the operation of the motor being caused by the attractive force of the pole projections of the electromagnet to the approaching pole salients of the armature, while the latter is rotating at a synchronous speed. As the pole salients of the armature pass the position shown in Fig. 1 where they are immediately adjacent and radially opposite respective pole projections of the field magnet, or after they have progressed slightly from this position, the total number of lines of force created in the field magnet will be rapidly reducing, due to the reversal of the direction of the current through the coil 26, so that there will be only a small magnetic force tending to resist the progress of any one pole salient of the armature to the next succeeding pole projection of the field magnet. With a six-pole armature as shown in Fig. 1, during each half cycle of the alternating current each pole salient of the armature will advance one-sixth of a revolution, to a position adjacent and radially opposite the next succeeding pole projection of the field magnet. Thus, when operating on a 60 cycle current, the synchronous speed of the motor will be 1200 revolutions per minute.

Due to the inertia of the rotor, which results, for example, from the use of a comparatively heavy armature, and due also to the width and relationship of the pole projections and salients, the armature will rotate smoothly and at uniform speed so long as the impressed frequency remains constant, and the amount of power supplied to the coil 26 may be varied quite considerably without interfering with the steady and synchronous operation of the motor. The motor is capable of developing considerable torque and it will be obvious that the construction is quite simple and economical. A number of different poles are energized by a single coil and thus a motor is provided having a comparatively low synchronous speed even though only a single coil may be used for energizing the magnet.

In Fig. 4 a motor is shown having pole salients equidistantly spaced circumferentially upon the armature or rotor, the number of pole projections on the magnet being one less than the number of salients on the rotor, but all being in the same angular distribution so that all of the pole projections of the magnet will be radially opposite and adjacent a corresponding number of salients of the rotor at the same time. In this way, for example, a motor can be designed for a synchronous speed of 1440 revolutions per minute on a 60 cycle current. For it is desirable that the number of pole salients of the armature be approximately, although not necessarily, exactly equal to the total number of pole projections provided on the field magnet.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a synchronous motor, a rotor having polar projections, and a multi-polar field, a circular series of field poles consisting of equal numbers of equal signs, said field poles also being unequally spaced around said rotor, and a single exciter winding to operate said rotor.

2. A single phase bi-polar synchronous motor comprising a laminated field structure having a plurality of unwound projections on each pole, an unpolarized, unwound and laminated rotor having projections thereon, all the angles between the centres of the unwound rotor projections and all the angles between the centres of the unwound stator projections measured with respect to the axis of the rotor harmonizing so that as one rotor projection and one stator projection registers all the projections on one of said members registering with the projections on the other, a single winding excited from a single source of alternating current magnetizing both the field and the rotor in the plane of the laminations and perpendicular to the axis of the rotor, the magnetism of the projections of one of said members at least reversing in a plane perpendicular to the axis of the rotor every cycle so that the speed of the rotor per second is equal to twice the cycles per second divided by the number of rotor projections.

3. A bi-polar synchronous motor of the core type comprising an unwound armature of magnetic material, said armature having a series of unwound pole salients; a field structure of magnetic material, said field structure having two unwound portions extending on diametrically opposite sides of said armature and which together embrace the major portion of said armature and each of said field portions having a series of unwound pole salients, the angular spacing of the salients on the rotor about its axis being the same as the angular spacing of the salients of the field about the same axis; and means of producing a reversing magnetic flux in said field structure to give said field portions opposite magnetic polarities whereby all of the salients of one of said field portions are north poles at a given instant and at the same instant all of the salients of the other of said field portions are south poles.

4. A bi-polar synchronous motor of the core type comprising an unwound laminated armature of magnetic material, said armature having a series of unwound pole salients; a laminated field structure of magnetic material, said field structure having two unwound portions extending on diametrically opposite sides of said armature, each of which has a series of unwound pole salients spaced to give simultaneous alignment of all the field salients with salients on the armature; and means to produce a reversing magnetic flux in said field structure to give said field portions opposite magnetic polarities whereby at a given instant all of the salients of one of said field portions are north poles and at the same instant all of the salients of the other of said field portions are south poles when said means is supplied with a suitable alternating current.

5. A bi-polar synchronous motor of the core type comprising an unwound laminated armature of magnetic material, said armature having a series of unwound pole salients; a laminated field structure of magnetic material, said field structure extending on diametrically opposite sides of said armature and having a plurality of unwound portions each of which has a series of unwound pole salients spaced to give simultaneous alignment of all of the field salients with salients on the armature; and means to produce a reversing magnetic flux on said field structure to give adjacent field portions opposite magnetic polarities whereby all of the salients of one of said field portions are north poles at a given instant and at the same instant all of the salients of the other field portion are south poles when said means is energized from a suitable source of alternating current.

6. A single phase bi-polar synchronous motor of the core type comprising an unwound armature of magnetizable material, said armature having a series of circumferentially disposed unwound pole salients, a field structure of magnetizable material having at least two series of poles with similar pole salients thereon adjacent the path of rotation of the pole salients on the armature, the angular spacing of the centers of the pole salients on the armature about its axis being the same as the angular spacing of the centers of the pole salients of the field about the same axis; means for producing a reversing magnetic flux in the structure in such manner that the lines of force from the pole salients on the field through the pole salients on the armature pass through the armature in the direction of the plane of rotation thereof, and to magnetize the field structure salients to opposite magnetic polarity whereby all of the adjacent salients in one series of the field salients are north poles at a given instant and at the same instant all of the adjacent salients of the other series of the field operative on a different peripheral part of the armature are south poles.

7. A bi-polar synchronous motor of the core type having an armature provided with a plurality of unwound radial pole arms terminating in pole faces, a field core having a pair of poles each provided with a plurality of inwardly extending projections terminating in pole faces, the centers of the pole faces on the armature having the same angular spacing about the axis of rotation as the angular spacing of the centers of the pole faces of the field magnet about the same axis, and a winding linking the core for producing an alternating magnetic flux throughout the structure, whereby the lines of magnetic force acting on the armature lie in substantially the plane of rotation of the armature when said winding is energized from an alternating source of current.

8. A bi-polar synchronous motor of the core type having an armature provided with a plurality of unwound radial pole arms terminating in pole faces, a magnetic field core having a pair of poles, each provided with a plurality of inwardly extending projections terminating in pole faces, the angular spacing of the centers of the pole faces on the armature about the axis of the armature and angular spacing of the centers of the pole faces on the field core about the same axis being in multiple relation; and a winding linking the core for producing an alternating flux in the magnetic circuit so arranged that the lines of magnetic force acting on the armature lie in substantially the plane of rotation of the armature when said winding is energized from a suitable source of alternating current.

9. A bi-polar synchronous motor of the core type comprising an unwound armature of magnetic material, said armature having a series of unwound pole salients, a field core of magnetic material, said field core having two pole portions extending on diametrically opposite sides of said armature and embracing the major portion thereof, each of said portions being divided into a series of unwound pole projections, the angular spacing of the centers of the pole projections about the axis of the armature being a multiple of the angular spacing of the centers of the armature pole salients about the same axis; and means to produce an alternating flux in the magnetic circuit to give said field portions opposite magnetic polarities whereby all of the projections on one of the field portions are north poles during one semicycle and during the same semicycle all of the salients on the other of said field portions are south poles, and the polarity of all the projections reversing during the other half of the cycle.

10. In a synchronous motor the combination of a stator having an even numbered plurality of polar projections and a rotor having a plurality of salient poles exceeding by an odd number the number of polar projections on the stator, each projection on the stator registering each with a projection on the rotor at the same instant of time.

11. In a synchronous motor, a bi-polar stator, each pole of the stator being divided into an even number of equally spaced projections, a rotor having an odd number of salient pole projections equally spaced with respect to the polar projections on the stator, said stator projections on both poles registering simultaneously and cyclically with the rotor projections, whereby the revolutions per minute of the rotor is equal to the frequency of the impressed voltage times a constant divided by an odd number.

12. A bi-polar synchronous motor having an even number of equally spaced polar projections on each pole, a rotor surrounded by said polar projections, the rotor having salient poles exceeding the number of polar projections by one, the projections on both poles registering simultaneously and cyclically with the rotor projections, whereby the R. P. M. of the rotor is equal to twice the frequency of the energizing current times 60 divided by the number of salient poles on the rotor.

13. A single phase bi-polar synchronous motor comprising a laminated field structure with a plurality of unwound projections on each pole, an unpolarized, unwound and laminated rotor having similar projections thereon, all the angles between the centres of the unwound rotor projections and all the angles between the centres of the unwound stator projections measured with respect to the axis of the rotor being equal, a single winding excited from a single source of alternating current magnetizing both the field and the rotor in the plane of the laminations and perpendicular to the axis of the rotor, all of the field projections registering simultaneously with the rotor projections once every half cycle, the magnetism of each of the field projections reversing in a plane perpendicular to the axis of the rotor every cycle and the magnetism of the rotor projections also reversing in the same plane every cycle while advancing through the field of each pole, and the speed of the rotor per second being equal to twice the number of cycles per second divided by the number of rotor projections.

14. A single phase synchronous motor including a stator excited from a winding energized from an alternating source of current, said stator terminating in a plurality of pole pieces each of which includes a plurality of unwound polar projections the angular distance between any two of said projections being equal to an integral multiple of the angular distance between the nearest two adjacent projections, and a rotor mounted for rotation intermediate said pole pieces which are radially arranged with respect thereto, said rotor including a plurality of unwound projections the angular distance between any two of said projections being equal to an integral multiple of the angular distance between said two nearest adjacent polar projections, the flux flow through the rotor being in planes perpendicular to the axis of said rotor.

15. A single phase synchronous motor comprising an unwound armature of magnetizable material, said armature having a series of circumferentially disposed unwound pole salients, a field structure of magnetizable material having at least two series of poles with similar pole salients thereon adjacent the path of rotation of the pole salients on the armature, the angular spacing of the centers of the pole salients on the armature about the axis of the armature and the angular spacing of the centers of the pole salients on the field structure about the same axis being in multiple relation and a winding linking the field structure for producing an alternating flux in the magnetic circuit so arranged that the lines of magnetic force passing through the armature lie in substantially the plane of rotation of the armature when said winding is energized from a suitable source of alternating current.

WILLIAM J. O'LEARY.

CERTIFICATE OF CORRECTION.

Patent No. 1,971,793.

August 28, 1934.

WILLIAM J. O'LEARY.

It is hereby certified that the surname of the second named assignee in the above numbered patent was erroneously written and printed as "Dylvig" whereas said name should have been written and printed as Dybvig, as shown by the records of assignments in this office; page 2, line 48, after "For" insert the words best efficiency; and that the said Letters Patent should be read with these corrections therein that the same may conform to the record of the case in the Patent Office.

Signed and sealed this 30th day of October, A. D. 1934.

Leslie Frazer

Acting Commissioner of Patents.

(Seal)